July 11, 1950 A. FEUCHT ET AL 2,514,852
BLOWING DEVICE FOR ROCK DRILLS
Filed Dec. 22, 1945 4 Sheets-Sheet 1
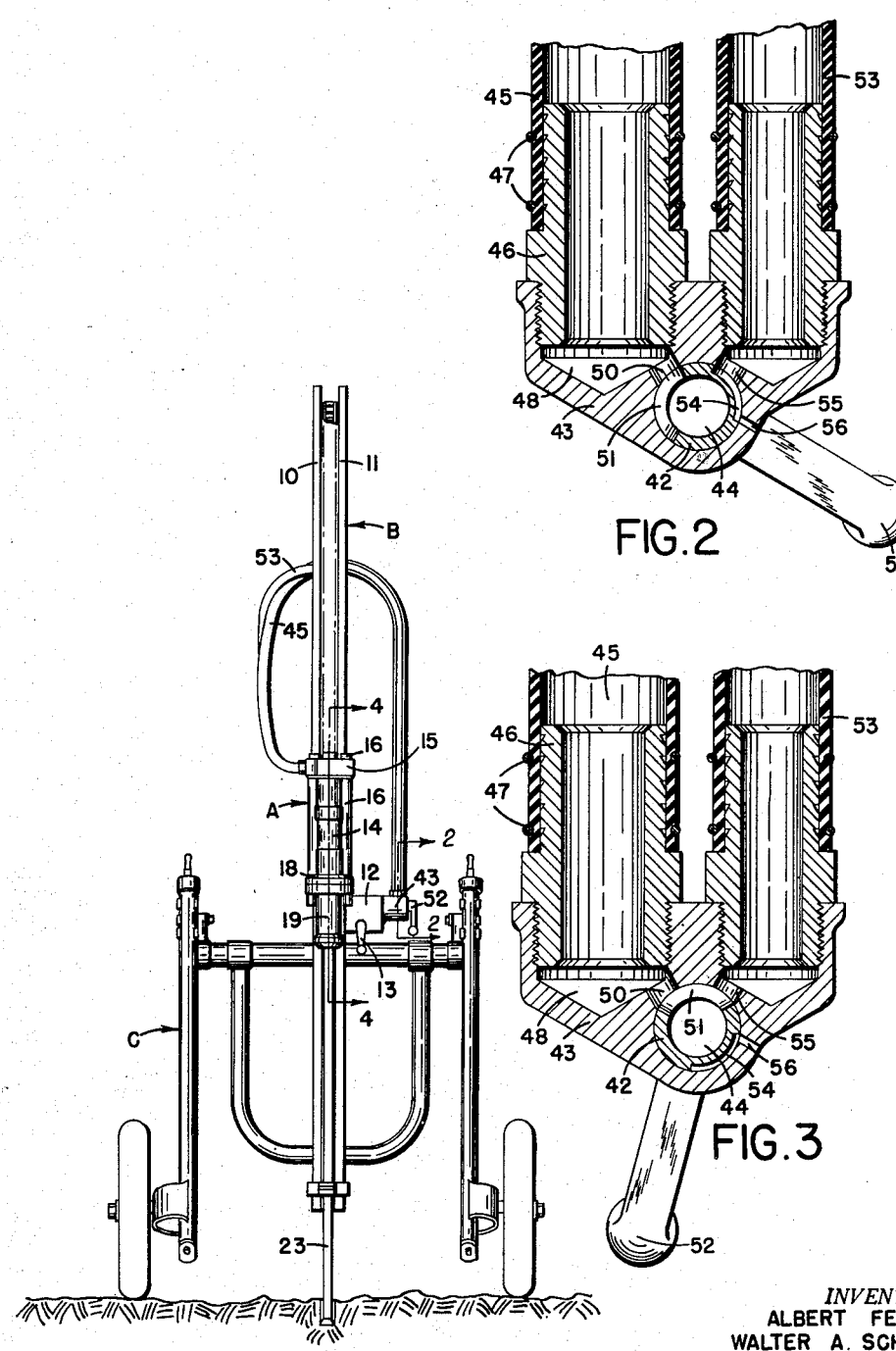
INVENTORS,
ALBERT FEUCHT
WALTER A. SCHIRMER
BY
Kwis, Hudson, Boughton & Williams
ATTORNEYS

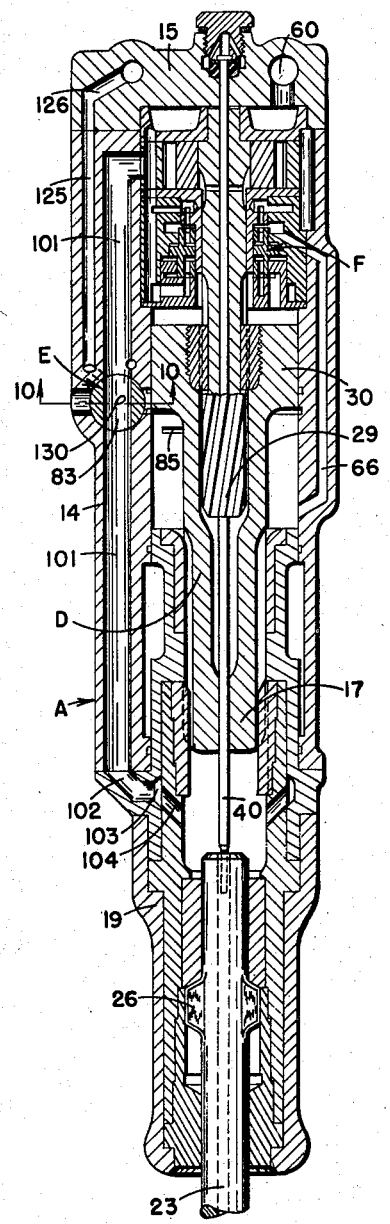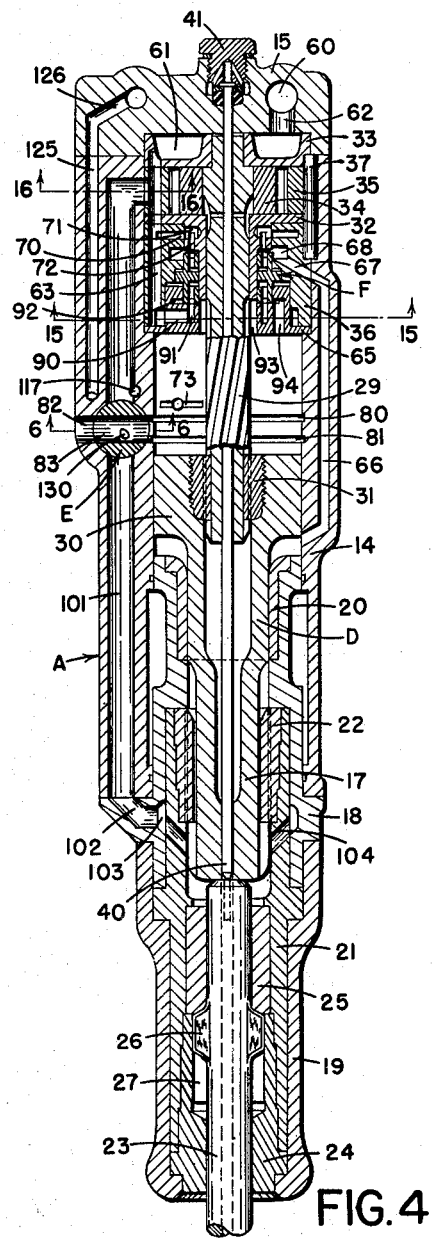

July 11, 1950

A. FEUCHT ET AL 2,514,852

BLOWING DEVICE FOR ROCK DRILLS

Filed Dec. 22, 1945

*INVENTORS,*
ALBERT FEUCHT
WALTER A. SCHIRMER

BY
*Kwis, Hudson, Boughton & Williams*
ATTORNEYS

Patented July 11, 1950

2,514,852

UNITED STATES PATENT OFFICE 2,514,852

BLOWING DEVICE FOR ROCK DRILLS

Albert Feucht, Garfield Heights, and Walter A. Schirmer, Cleveland, Ohio, assignors, by mesne assignments, to Le Roi Company, Milwaukee, Wis., a corporation of Wisconsin Application December 22, 1945, Serial No. 636,894

4 Claims. (Cl. 121—6)

1

This present invention relates to pressure fluid operated rock drills of the reciprocating impact piston type and, more particularly, to valve mechanisms for controlling the operation of such rock drills.

One of the limitations to be found in prior art drills of the character referred to is their inability to deliver sufficient compressed fluid for blowing the hole drilled thereby clean of dust and cuttings. In some prior devices having separate ports and passages for the blowing operation, it has been necessary to balance the piston portion of the reciprocating hammer of the drill over the exhaust port of the drill motor to avoid waste of pressure fluid with consequent loss in blowing pressure; however, this method has not always proven satisfactory. In other devices, the volume of fluid available for blowing has been limited to the capacity of the automatic valve of the drill motor and is generally insufficient for blowing deep holes clean because a good automatic valve is economical in the disbursement of compressed fluid.

In accordance with the above, therefore, one of the principal objects of the present invention is the provision of a novel and improved rock drill of the character referred to having valve mechanism, including an automatic valve for the drill motor and means for supplying an abundance of compressed fluid for the blowing operation.

Another object is the provision of a novel and improved rock drill of the character referred to having valve mechanism that can be operated at a distance from the drill proper for controlling the drilling and blowing operations of the drill.

Another object is the provision of a novel and improved rock drill of the character referred to having means for sealing off the exhaust port of the drill motor during the blowing operation without the necessity of balancing the piston portion of the reciprocating hammer or plunger over the exhaust port of the motor.

A further object is the provision of a novel and improved rock drill of the character referred to having a blowing system in which the full supply of compressed fluid available for operating the rock drill motor is made available for the blowing operation.

The invention resides in certain constructions and combinations and arrangements of parts, and further objects and advantages will be apparent to those skilled in the art to which it relates from the following description of the preferred

2 embodiment described with reference to the accompanying drawings forming a part of this specification in which similar reference characters designate corresponding parts, and in which:

Fig. 1 is an elevation of a wagon-type rock drill employing the present invention.

Fig. 2 is a fragmentary sectional view on the line 2—2 of Fig. 1, showing the remote control valve in position for drilling.

Fig. 3 is a view similar to Fig. 2, showing the remote control valve in position for blowing.

Fig. 4 is a longitudinal sectional view taken along the line 4—4 of Fig. 1 and showing the drill in the operation of drilling.

Fig. 5 is a view similar to Fig. 4, showing the drill in the operation of blowing.

Figure 6:
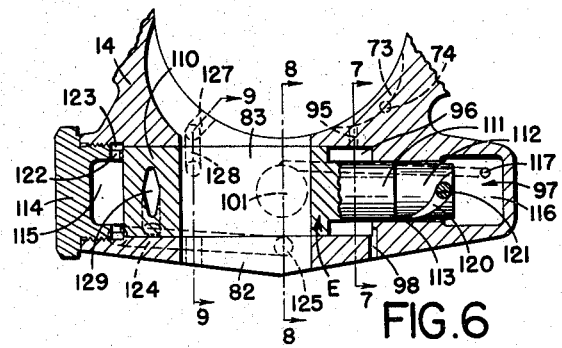
Fig. 6 is a fragmentary sectional view taken on the line 6—6 of Fig. 4 and shows the differential valve in the drilling position.
Figure 7:
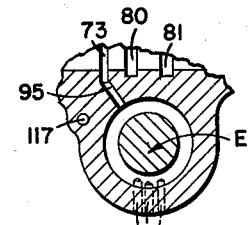
Figure 8:
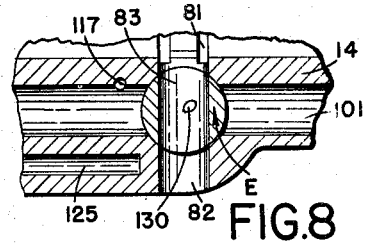
Figure 9:
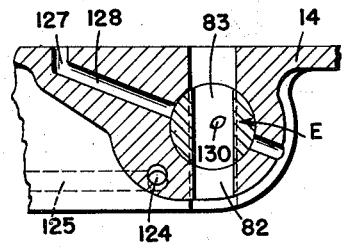

Figs. 7, 8 and 9 are fragmentary sectional views taken on the lines 7—7, 8—8 and 9—9, respectively, of Fig. 6.

Figure 10:
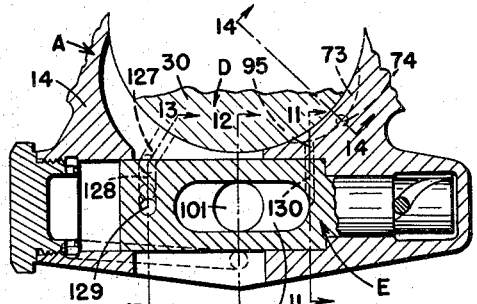

Fig. 10 is a section similar to Fig. 6, taken on the line 10—10 of Fig. 5, and shows the differential valve in position for blowing.

Figure 13:
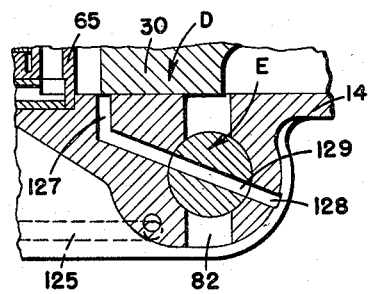
Figure 11:
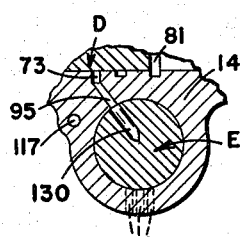
Figure 12:
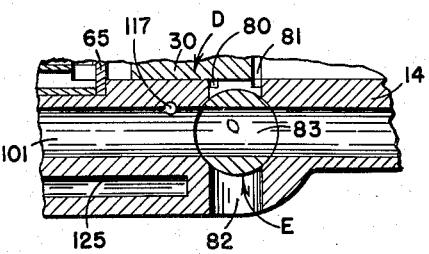

Figs. 11, 12 and 13 are fragmentary sectional views taken on the lines 11—11, 12—12 and 13—13, respectively, of Fig. 10 for comparison with Figs. 7, 8 and 9.

Figure 14:
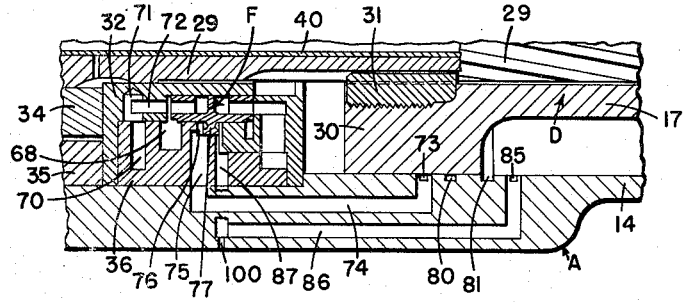

Fig. 14 is a fragmentary sectional view of the automatic valve trip mechanism taken along the line 14—14 of Fig. 10.

Figure 15:
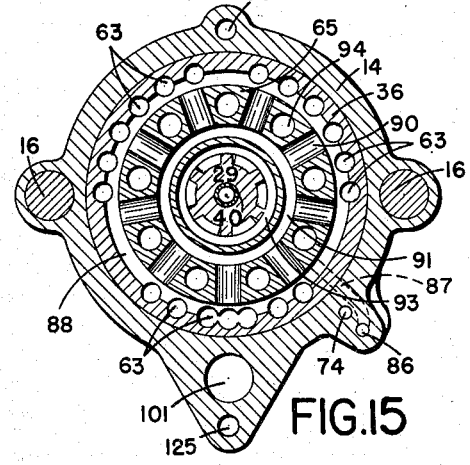

Fig. 15 is a sectional view, taken approximately on the line 15—15 of Fig. 4.

Figure 17:
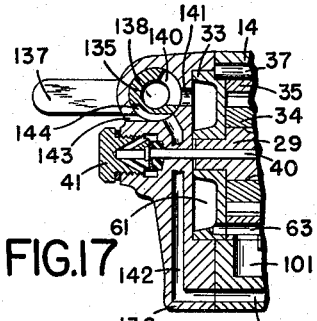
Figure 18:
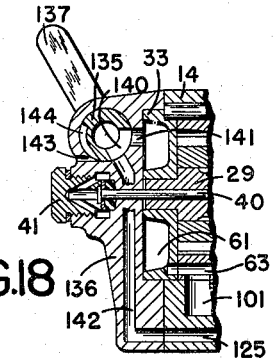
Figure 16:
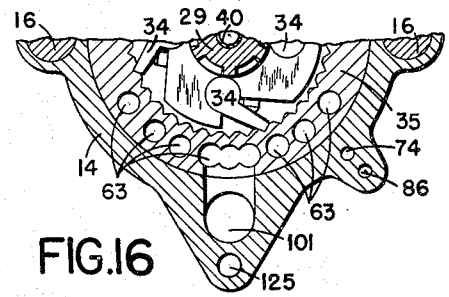

Fig. 16 is a fragmentary sectional view, with portions in elevation, taken approximately on the line 16—16 of Fig. 4; and Figs. 17 and 18 are fragmentary sectional views showing a modified form of the invention applied to a hand-operated rock drill.

Referring to the drawings, the reference character A designates generally a rock drill slidably mounted in a conventional manner upon parallel ways 10, 11 of a rock drill feeding mechanism B mounted on a wagon drill rig C. The drill rig shown per se forms no part of the present invention, is similar to that disclosed and claimed in a copending application of Albert Feucht, Serial No. 564,583, filed November 22, 1944, entitled Portable Drill Rig, and will not be herein described in detail. Suffice it to say that the rock drill A is adapted to be moved from one end to the other of the ways 10, 11 by a pressure fluid actuated feed motor, not shown, of the feeding mechanism B fixedly secured to the frame of the rig. The actuation of the feed motor is controlled by a manually operated valve 12, including the hand lever 13.

The rock drill A comprises a drill motor including a tubular cylinder member 14, see Figs. 4 and 5, within which a plunger D constituting a combination piston and hammer is reciprocably supported. The rear or upper end of the member 14 is closed by a back head 15 connected thereto as by bolts 16, see Figs. 1 and 15. The front or lower end of the member 14 is closed except for the opening through which the shank end or hammer 17 of the plunger D projects, by a tubular spacer member 18 provided with an external flange fixedly secured between the front or lower end of the cylinder 14 and the rear or upper end of a tubular chuck housing 19. The spacer member 18 includes a rearwardly projecting portion provided with a spacer bushing 20 within which the reduced shank portion or hammer end 17 of the combination piston and hammer is slidably supported. The chuck housing 19 encloses a chuck rotating sleeve 21, the rear end of which is provided with a chuck nut 22 fixedly secured thereto and within which the shank end of the plunger D is slidably but non-rotatably secured. The rear end of the drill steel or bit 23 projects into a chuck jaw 24 non-rotatably secured to the forward end of the sleeve 21, and a bushing 25 also located within the sleeve 21. The drill steel 23 is provided with lugs 26 which engage within suitable slots 27 in the chuck jaw 24 so that rotation is imparted to the drill steel upon rotation of the chuck jaw 24 and the sleeve 21.

The combination piston and hammer D is adapted to be rotated upon reciprocation thereof and, in turn, the sleeve 21, the chuck 24, and the drill steel 23 by a rifle bar 29 projecting into the rear or piston end 30 of the plunger D and having splined engagement with a nut 31 detachably secured to the plunger. The rifle bar 29 is rotatably supported in a valve sleeve 32 within the cylinder 14 adjacent to its rear end and a rifle bar bearing plate 33 within the back head 15. The rifle bar 29 is prevented from rotating as the plunger D travels in a backward direction by a plurality of spring pressed pawls 34 carried thereby and located intermediate the valve sleeve 32 and the rifle bar bearing plate 33, which pawls cooperate with a ratchet ring 35 also interposed between the sleeve 32 and the plate 33. The construction is such that the drill steel 23 is given a partial rotation upon each reciprocation of the combination piston and hammer D. The valve sleeve 32, plate 33, ratchet ring 35 and a valve block 36, hereinafter referred to, are maintained in predetermined alignment and prevented from rotating within the cylinder member 14 by a pin 37 located in a longitudinal aperture formed half in the cylinder 14 and half in the parts referred to.

The drill steel 23 is hollow and water, air, steam or the like, may be supplied thereto by a tube 40 during the drilling operation. The reduced front end of the tube 40 normally projects into the rear end of the drill steel 23. The rear end of the tube 40 is connected to the back head 15 and the tube extends axially of the drill through the rifle bar 29 and the combination piston and hammer D, etc. The rear end of the tube 40 may be connected to a source of fluid in any convenient manner, as by a fitting 41.

Pressure fluid, preferably compressed air, for operating the drill may be obtained from any suitable source, not shown, and is supplied to the drill by a remote control valve 42 rotatably supported within a valve housing 43 connected to and forming a part of the valve housing 12, but which may be otherwise constructed and located, as desired. The valve 42 is tubular in shape and the interior thereof 44 is continuously connected with a source of pressure fluid. Pressure fluid for reciprocating the combination piston and hammer D of the drill motor, is supplied thereto from the valve 42 by a flexible motor conduit or hose line 45 connected to the back head 15 of the drill and to the housing 43 in any suitable manner. As shown, the hose 45 is connected to the housing 43 by a nipple 46 to which the hose is secured by suitable clamp wires 47. The interior of the nipple 46 communicates with a chamber 48 in the housing 43, which chamber is adapted to be selectively connected with the interior of the valve 42 by a passage 50 in the housing 43 and an arcuate slot 51 in the side of the valve 42, see Fig. 2.

The valve 42 may be rotated in a counterclockwise direction from the position shown in Fig. 2 to shut off the flow of pressure fluid to the conduit 45, and in turn, the rock drill motor, or, to the position shown in Fig. 3 by a manual lever 52 fixed thereto. When rotated to the position shown in Fig. 3, pressure fluid is supplied not only to the rock drill motor but to a differential valve, designated generally by the reference character E, and hereinafter more specifically referred to, by a differential valve conduit or hose 53 connected to the valve housing 43 in a manner similar to that in which the motor hose 45 is connected thereto, and to the back head 15. When the valve 42 is in the position shown in Fig. 2, the differential hose 53 is connected to atmosphere by an arcuate slot 54 in the exterior of the valve 42, which slot communicates with the passage 55 in the housing 43 similar to the passage 50, previously referred to, and with a port 56 in the housing 43, which port is continuously open to atmosphere.

Pressure fluid is delivered by the motor hose 45 to an aperture 60 in the back head 15, which aperture is continuously in communication with an annular chamber 61 in the rear side of the rifle bar bearing plate 33 by a passage 62 in the back head member. The chamber 61 is in continuous communication with a plurality of longitudinally extending passages 63, only one of which is shown in Fig. 4, formed partly in the plate 33, ratchet ring 35, valve sleeve 32, and valve block 36. The flow of pressure fluid to opposite sides of the piston portion of the plunger D for reciprocating the latter is controlled by an automatic valve F slidably supported in a suitable aperture formed partly in the valve sleeve 32, the valve block 36 and a valve cap 65, all of which are located in the cylinder member 14 adjacent to its rear end and held in fixed relation thereto and to each other by being clamped between a shoulder on the interior of the cylinder and the back head 15.

As shown in Fig. 4, the parts are in the position which they occupy when the plunger D is at the forward end of its stroke. Pressure fluid is being admitted to the cylinder ahead of the piston 30 of the plunger D through a passage 66 in the cylinder wall, the rear end of which is in continuous communication with a radial passage 67 in the valve block 36, which radial passage in turn communicates with an annular chamber 68 also in the valve block. Pressure fluid is being supplied to the chamber 68 from the passages 63 by an annular groove 70 and a plurality of radial passages 71 in the valve block and sleeve, respectively, in continuous communication with each other and with an annular groove 72 in the valve sleeve 32, which passages are open to the annular chamber 68 because the rear end of the valve F is unseated, the valve being in its forward position.

The valve F was moved to its forward position to simultaneously seat the forward end thereof and unseat the rear end to cut off the flow of pressure fluid to the end of the cylinder at the rear of the piston and direct it to the end of the cylinder ahead of the piston 30 as the plunger D approached the forward end of its stroke by the uncovering of a return air trip port 73 in the cylinder wall by the piston 30. The piston 30 is of appreciable width and except when the plunger is adjacent to the forward end of its stroke, maintains the port 73 closed. The port 73 is continuously connected by passages 74 and 75 in the cylinder 14 and valve block 36, respectively, see Fig. 14, with the rear end of an annular chamber 76 within which an annular flange 77 on the automatic valve F projects.

Continued movement of the plunger D after the return air trip port 73 has been opened, uncovers or opens the exhaust ports or grooves 80, 81 in the cylinder wall, which grooves are normally open to atmosphere through aligned passages 82, 83 in the cylinder wall and in differential valve E, respectively. The exhausting of pressure fluid from the rear portion of the cylinder and the admission of pressure fluid ahead of the piston 30 through the passage 66 in the manner just described causes the plunger D to return to the rear of the cylinder.

As the plunger 17 approaches the end of its return stroke, a power stroke trip port 85 in the cylinder, located slightly forward of the forward exhaust groove 81, is uncovered by the piston, admitting pressure fluid by way of passages 86, 87 in the cylinder wall and valve block 36, respectively, to the forward end of the annular chamber 76, whereupon the automatic valve F is shifted to its rear position, simultaneously seating its rear end and unseating its forward end. The seating of the left-hand end of the automatic valve stops the flow of pressure fluid to the forward end of the cylinder. The unseating of the right-hand end of the valve permits pressure fluid to flow from the passages 63, the lower or forward ends of which are all connected by an annular groove 88, through a plurality of radial passages 90 and an annular passage 91 into an annular chamber 92, from which chamber the pressure fluid passes to the cylinder through an annular passage 93 and a plurality of longitudinal passages 94 in the valve cap, thus causing the plunger D to execute its power stroke. As the plunger approaches the forward end of its travel, the return air trip port 73 is again uncovered and the cycle is repeated.

The possibility of pressure building up on opposite sides of the automatic valve F where it is not desired is eliminated by having the return air trip port 73 and the power trip port 85 continuously open to atmosphere during the drilling operation. For this purpose the return air trip port 73 is connected by a passage 95 of relatively small diameter, see Fig. 6, with a part 96 of a transversely extending bore, designated generally as 97, formed in a boss, within which bore the differential valve E is slidably and rotatably supported. During the drilling operation, the differential valve is in the position shown in Fig. 6 and the right-hand end of the portion 96 of the bore 97 into which the passage 95 opens is open to atmosphere through a plurality of passages 98, see Fig. 7, communicating with the right-hand end of the part 96 of the bore 97 and atmosphere. The passage 86 in the cylinder wall which connects the power stroke trip port 85 with the transversely extending passage 87 in the valve block 36 is open to atmosphere at all times through a passage 100 in the cylinder wall 14, which passage is of comparatively small diameter and does not interfere with the normal operation of the device. Many of the passages shown are duplicated in a manner similar to that in which the passages 63, 90, 94, etc. are shown duplicated in the drawings, in order to reduce the resistance to the flow of fluid pressure from one part of the tool or valve to another.

The cylinder 14 is provided with a longitudinally extending aperture 101, see Fig. 4, the rear end of which is in continuous communication with several of the passages 63 where they pass through the ratchet ring 35, see Fig. 16. The passage is normally closed intermediate its end by the differential valve E. When it is desired to clean the hole being drilled of dust and cuttings accumulated therein, the differential valve E is actuated to open the longitudinally extending passage 101 admitting fluid pressure to the forward end of the passage 101 which is connected through a radial passage 102 in the spacer member 18 to an annular chamber 103 also in the member 18, which chamber is connected by a plurality of radial passages 104 in the rotating sleeve 21 with the interior of the sleeve intermediate the chuck nut 22 and the rear end of the chuck bushing 25, that is, into the space or chamber into which the rear end of the drill steel 23 projects. The passages 101, etc., are made relatively large, with the result that the full amount of pressure fluid available for drilling is made available for blowing.

The differential valve E comprises three cylindrical portions 110, 111, 112 of different diameter and is slidably and rotatably supported in the transversely extending bore 97 having portions of different diameter, two of which 96, 113, corresponding with the diameter of sections 110, 111 of the differential valve. The larger portion 110 of the differential valve is slidable within the larger portion 96 of the bore 97 and the intermediate portion 111 projects into the smaller portion 113 of the bore 97. The left-hand end of the aperture or bore 97, as viewed in Fig. 6, is closed by a cap 114 having an aperture 115 in the right-hand side thereof which forms a fluid pressure chamber to the left of the differential valve E when the valve is in its left-hand position.

The right-hand end 112 of the valve is slightly smaller than the part 111 and the adjacent end 116 of the bore 97 is slightly enlarged to provide a fluid pressure chamber adjacent to the right-hand end of the differential valve, which chamber is continuously supplied with pressure fluid by a passage 117 in the cylinder wall communicating therewith and with the passage 101 to the left or rear of the differential valve, as clearly shown in Fig. 4. The small end 112 of the differential valve has a spiral slot 120 formed in the periphery thereof within which the projecting end of a pin 121 fixed to the cylinder 14 engages. During the drilling operation, the left-hand end of the differential valve, as viewed in Fig. 6, is held against the right-hand end of the cap 114 by the constant pressure of the pressure fluid against the small end 112 of the differential valve and the passage 83 through the differential valve is in register with the exhaust passage 82 in the cylinder 14, as previously described.

The chamber 115 in the cap 114 is at all times connected with the differential valve conduit or hose line 53 through radial apertures 122 in the cap 114 which communicate with an annular chamber 123, which annular chamber is connected by a transversely extending passage 124 with a longitudinally extending passage 125, the rear portion of which is in alignment with a passage 126 in the back head 15, which latter passage is in direct communication with the conduit 53. When the remote control valve 42 is shifted from the position shown in Fig. 2 to that shown in Fig. 3, pressure fluid in addition to being supplied to the drill motor through the conduit 45 is supplied through the conduit 53 to the chamber 115 at the left-hand end of the differential valve E where it will act against the larger end of the differential valve, exerting a greater force thereon than the force constantly applied to the smaller or right-hand end of the valve, with the result that the differential valve will be shifted longitudinally in the bore 97, and through the action of the spiral slot 120 and a pin 121 it will be rotated through 90 degrees. The position which the valve now occupies is shown in Figs. 10 to 13.

With the differential valve in the position shown in Figs. 10 to 13, the exhaust passage 82 for the drill motor is closed and the blowing passage 101 is open through the passage 83 in the differential valve. Actuation of the automatic valve F and reciprocation of the plunger D of the drill motor are stopped in predetermined positions. If the plunger D is adjacent to the forward end of its stroke when the differential valve is shifted to blowing position, pressure fluid is being supplied to the cylinder ahead of the piston 30 through the passage 66, with the result that the piston will be moved toward the rear. That part of the cylinder to the rear of the piston 30 is vented to atmosphere by a passage 127 opening into the rear part of the cylinder intermediate the return trip port 73 and the valve cap 65. The passage 127 is connected to the inner end of a passage 128 extending across the bore 97 and opening to atmosphere. The passage 128 is normally closed by the differential valve, see Fig. 9, but the respective parts thereof are connected by a passage 129 in the differential valve when the parts are in the position referred to, see Fig. 13.

The return air trip port 73 is no longer vented to atmosphere through the passages 95, etc., but is now connected to the passage 101 by a passage 130 in the differential valve opening into the aperture 83, which passage now communicates with the passage 95 previously referred to. The construction is such that pressure fluid is supplied through the passage 130, port 73 which is again covered by the piston 30 shortly after it starts its return stroke, and passages 74, 75 to the annular chamber 76 at the rear side of the flange 77 of the automatic valve F. Thus the automatic valve is held in its forward position shown in Fig. 4 while the differential valve is in position for blowing. When the power stroke trip port 85 is exposed by the piston 30 as it moves toward the rear, it is ineffective to shift the automatic valve from the position referred to because of the pressure in the chamber 76 and the fact that the passage 86 is constantly open to atmosphere by the passage 100, thus preventing the building up of sufficient pressure on the forward side of the automatic valve to overcome the pressure on the rear side thereof.

From the foregoing it will be apparent that if the plunger D is at the rear end of its stroke when the automatic valve is shifted to blowing position, it will remain there. If the plunger is in any other position, it will be moved to the rear end of its stroke, which is approximately the position shown in Fig. 5.

A modified form of the invention is illustrated in Figs. 17 and 18 wherein a hand-operated valve 135 corresponding with the valve 42 of the preferred embodiment is mounted in the back head 136. The rock drill is the same as that shown in the preferred embodiment, with the exception of the back head, and only the rear end of the drill is shown. The parts shown in Figs. 15 and 16, which are duplicates of those employed in the preferred embodiment are designated by the same reference characters. The valve 135 has three positions corresponding with the three positions of the valve 42 and is adapted to be manipulated from one position to the other by a lever 137 connected thereto. As shown in Fig. 17, the central aperture 138 of the valve, which aperture is continuously connected with a source of pressure fluid, is connected by a passage or port 140 therein with a passage 141 in the back head 136, which latter passage corresponds with the passage 62 in the back head 15 and communicates with the annular chamber 61 in the bearing plate 33. The passage 142 corresponding with the passage 126 of the preferred embodiment is open to atmosphere through a port 143 by an arcuately-shaped groove 144 in the valve 135 corresponding with the groove 54 in the valve 42. When the valve 135 is in the position shown in Fig. 18, the central aperture thereof is connected by the port 140 to both the drill motor and the differential valve, the former by way of the passage 141 and the latter by way of the passage 142.

From the foregoing it will be apparent that the objects heretofore enumerated and others have been accomplished and that there has been provided a new and improved, pneumatic rock drill of the reciprocating plunger type wherein all of the pressure fluid available for operating the drill motor is made available for the blowing operation and wherein pressure fluid delivered to the rear end of the hollow drill steel is prevented from escaping through the drill motor, etc., and is forced to flow through the drill steel, thus making it possible to blow holes clean irrespective of their depth. While the preferred embodiments of the invention have been described in considerable detail, we do not wish to be limited to the particular constructions shown which may be varied within the scope of this invention and it is our intention to hereby cover all adaptations, modifications and uses thereof which come within the scope of the appended claims.

Having thus described our invention, we claim:

1. In a pressure fluid operated rock drill of the reciprocating impact plunger type, a drill motor adapted to have a hollow drill steel operatively connected thereto, and means for supplying pressure fluid to said motor and to the interior of the drill steel, said means comprising a pressure fluid conveying passage, an automatic valve for controlling the flow of the pressure fluid from said passage to said drill motor and a blow valve for controlling the flow of pressure fluid from said passage to the drill steel, said blow valve comprising a cylinder and a plunger slidable therein, said cylinder and plunger having a small end and a large end, means for connecting the small end of said cylinder permanently to said passage for constantly admitting pressure fluid to said small end and normally maintaining said blow valve into inoperative position, and remote control means for introducing pressure fluid into the large end of said cylinder for shifting said plunger to blowing position.

2. In a pressure fluid operated rock drill of the reciprocating impact plunger type, a drill motor adapted to have a hollow drill steel operatively connected thereto, and means for supplying pressure fluid to said motor and to the interior of the drill steel, said means comprising an automatic valve for controlling the flow of pressure fluid to said drill motor and a blow valve for controlling the flow of pressure fluid to the drill steel, said blow valve comprising a cylinder and a plunger slidable therein, said cylinder and plunger having a small end and a large end, means for connecting the small end of said cylinder permanently to the pressure fluid supply ahead of said automatic valve for constantly admitting pressure fluid to said small end and normally maintaining said blow valve into inoperative position, and control means for introducing pressure fluid into the large end of said cylinder for shifting said plunger to blowing position.

3. In a pressure fluid operated rock drill of the reciprocating impact plunger type, a drill motor adapted to have a hollow drill operatively connected thereto, and means for supplying pressure fluid to said motor and to the interior of the drill steel, said means comprising a first and a second pressure fluid conveying conduits, an automatic valve for controlling the flow of pressure fluid from said first conduit to said drill motor, and a blow valve for controlling the flow of pressure fluid from said first conduit to the drill steel, said blow valve comprising a cylinder and a plunger slidable therein, said cylinder and plunger having a small end and a large end, means for connecting the small end of said cylinder permanently to said first conduit ahead of said automatic valve for normally maintaining said blow valve into inoperative position, and control means for connecting the large end of said cylinder to said second conduit for shifting said plunger to blowing position.

4. In a fluid operated rock drill of the reciprocating impact plunger type, a fluid motor comprising a piston and a cylinder therefor, a hollow drill steel operatively associated with said motor, means for supplying pressure fluid to said cylinder on opposite sides of said piston alternately and to the interior of the drill steel, said cylinder having exhaust passages adapted to be uncovered by said piston, an automatic valve for controlling the supply of pressure fluid to said motor, a blow valve for controlling the supply of pressure fluid to the drill steel, said blow valve comprising a cylinder and a plunger slidable and rotatable therein, said cylinder and plunger having a passage therethrough and functioning in one position of the plunger to close off flow to the drill steel and open said exhaust and in another position to establish flow to said drill steel and close off said exhaust, means responsive to the slidable movement of said plunger for automatically effecting its rotation into said one or another position, said cylinder and plunger having a small end and a large end, means for connecting said small end permanently to the pressure fluid supply ahead of said automatic valve for normally maintaining said blow valve into said one position, and control means for introducing pressure fluid into the large end of said cylinder for sliding and rotating said plunger into said another position.

ALBERT FEUCHT.
WALTER A. SCHIRMER.

REFERENCES CITED

The following references are of record in the file of this patent:

UNITED STATES PATENTS

| Number | Name | Date |
| --- | --- | --- |
| 1,100,825 | Greve | June 23, 1914 |
| 1,637,203 | Slater | July 26, 1927 |
| 1,813,774 | Smith | July 7, 1931 |
| 1,829,245 | Smith | Oct. 27, 1931 |
| 1,865,609 | Bayles | July 5, 1932 |
| 2,251,224 | Curtis | July 29, 1941 |
| 2,326,383 | Morrison | Aug. 10, 1943 |